May 15, 1934.  W. W. CARSON, JR  1,958,814
VALVE MECHANISM
Filed March 22, 1933
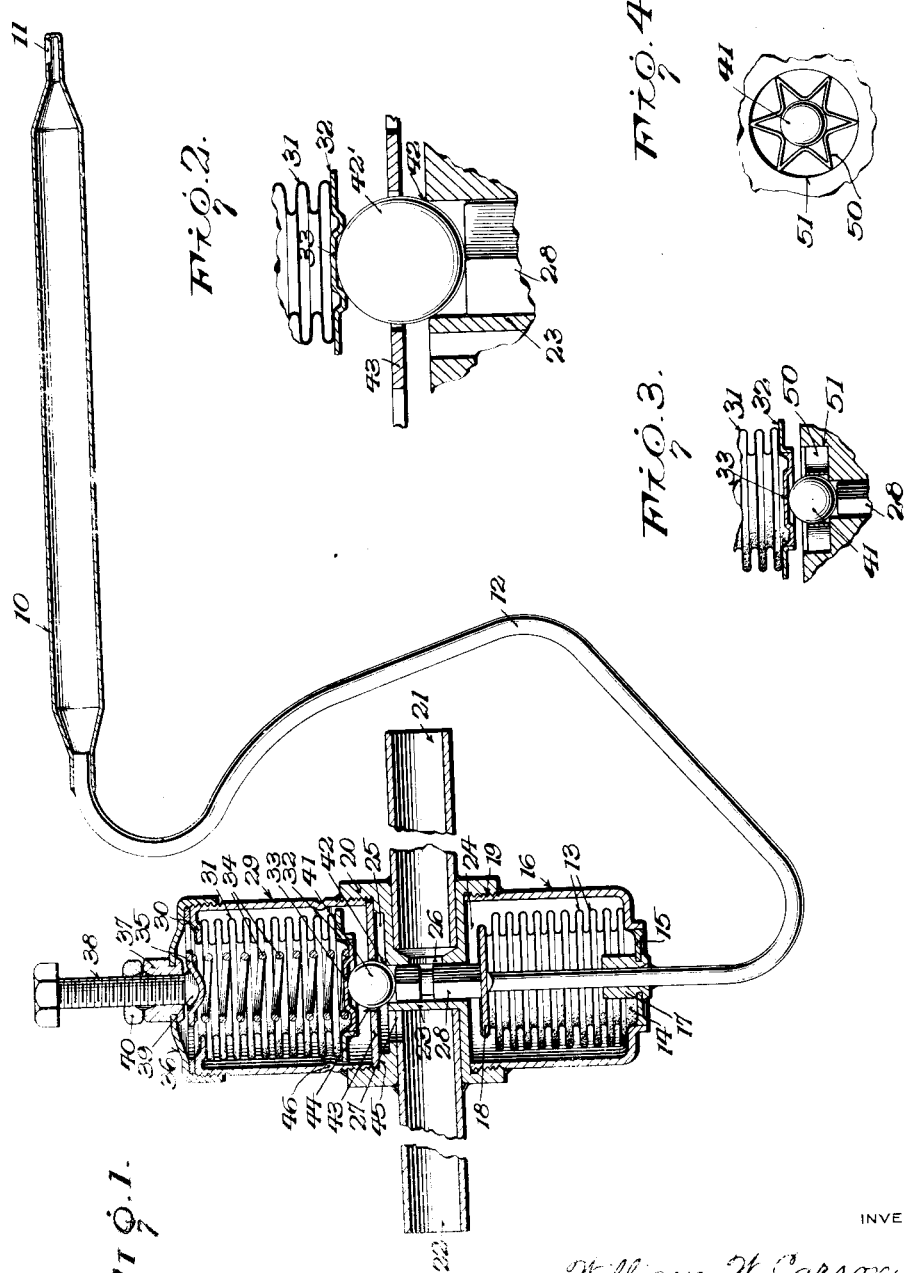
INVENTOR
William W. Carson, Jr.
BY
Cameron, Kerkam + Sutton
ATTORNEYS Patented May 15, 1934

1,958,814

UNITED STATES PATENT OFFICE 1,958,814

VALVE MECHANISM

William W. Carson, Jr., Knoxville, Tenn., assignor to The Fulton Sylphon Company, Knoxville, Tenn., a corporation of Delaware Application March 22, 1933, Serial No. 662,149

14 Claims. (Cl. 236—99)

This invention relates to valve mechanism, particularly for temperature regulators, and while the invention is capable of embodiment in regulators of a wide variety of constructions and adapted for a wide variety of uses, it will be illustrated and described, for purpose of exemplification, as embodied in a regulator of a type suitable for employment in a refrigerating device or system, particularly of the dry ice type.

It has heretofore been proposed to provide a temperature regulator wherein the valve member is associated with two opposed expansible and collapsible corrugated metal walls or bellows, and wherein the valve member is either rigidly connected to one or both of said members or wherein provision for misalignment has been incorporated in the form of some pivotal or swivel connection. Devices of this character are open to the objection that where the valve member is rigidly connected with one or both of the bellows, any warping or lateral or angular displacement of the parts interferes with the proper action and seating of the valve member, while where swivel or other movable connections have been employed to compensate for misalignment other difficulties have been encountered owing to the tendency of the joints to stick, the development of undue friction at the joint at the moment of seating, etc.

It is an object of this invention to provide a temperature regulator employing opposed expansible and collapsible corrugated metal walls or bellows with an interposed valve member which obviates the difficulties heretofore experienced.

Another object of this invention is to provide a device of the character just described wherein the valve member is in the form of a ball that is unattached to any part so that within suitable limits it may roll freely to seat properly irrespective of any condition of lateral or angular displacement of the opposed bellows or the members associated therewith.

Another object of this invention is to provide a valve mechanism which uses a freely floating ball as the valve member and which at the same time requires no special construction of valve seat.

Another object of this invention is to provide a device of the type just characterized wherein the flow of fluid to and through the valve port is not constricted by the ball as it moves away from its seat.

Another object of this invention is to provide a device of the type just characterized which may employ a valve seat that is machined in the valve casing, thereby eliminating the necessity for a removable valve seat as well as a valve seat of special construction.

Another object of this invention is to provide a device of the type just characterized wherein the freely floating ball valve member is guided and prevented from improper displacement by means which may be inexpensively formed by simple operations, such as stamping from sheet metal.

Other objects will appear as the description of the invention proceeds.

The invention is capable of receiving a variety of mechanical expressions some of which are shown on the accompanying drawing, but it is to be expressly understood that the drawing is for purposes of illustration only and is not to be construed as a definition of the limits of the invention, reference being had to the appended claims for that purpose.

Referring in detail to the drawing, wherein the same reference characters are employed to designate corresponding parts in the several figures, Fig. 1 is an elevation, partly in section, of a temperature regulator suitable for use in a refrigerating device or system and embodying the present invention;

Fig. 2 is a fragmentary section to illustrate how the diameter of the ball may be proportioned with relation to the diameter of the bellows where a substantial difference in pressure may exist at the two sides of the valve; and Figs. 3 and 4 are respectively a fragmentary axial section and fragmentary plan view to illustrate another embodiment of the guide member.

In the form shown, the regulator includes a thermostatic bulb 10 for subjection to the controlling temperature. Said bulb may be of any suitable size, construction and material, and is designed to contain a volatile fluid. A filling opening is shown at 11, and after the bulb is charged said opening may be closed in any suitable way, as by soldering. Bulb 10 is connected through suitable tubing 12, which may be flexible or rigid, with the interior of a bellows 13 of any suitable size, construction and material, said bellows being shown as attached at its relatively stationary end 14 to a closure plate 15 which may be soldered or otherwise secured in an opening in the end of a cup-shaped housing member 16. The conduit 12 is extended through a block 17 supported by the disc 15, and the end thereof projects sufficiently within the bellows 13 so as to constitute a stop for the movable end wall 18 of said bellows 13, to prevent undesired collapse of said bellows after the valve member has become properly seated.

Housing member 16 is suitably secured, as by a threaded connection at 19, to the body member 20 of the valve casing, which body member is provided in any suitable way with inlet and outlet conduits or passages 21 and 22. Interiorly said member 20 is provided with a tubular bore 23 which opens at its opposite ends into the chambers 24 and 25. An aperture or slot 26 in the wall of said bore provides communication between the inlet conduit 21 and said bore, while an aperture or slot at 27 provides communication between the chamber 25 and the outlet conduit 22. Mounted loosely for reciprocation within said bore 23 is a thrust member 28 which may merely rest on or be attached to the end wall 18 of bellows 13.

The body member 20 is provided with a second housing member 29 in axial alignment with the housing member 16, said member 29 being secured to the member 20 in any suitable way, as by a threaded connection. Member 29 is provided with an inwardly directed flange 30 at its outer end and a second bellows 31 is suitably attached to said flange, as by brazing or soldering, in alignment with the bellows 13. At its opposite end bellows 31 is suitably attached to a removable end disc 32, shown as provided with a central depressed portion 33. Disposed within the bellows 31 is a coil spring 34 which at one end engages the movable end wall of bellows 31 or the end disc 32 attached to said bellows 31, and which at its opposite end is attached to or suitably associated with a spring plate 35. Member 29 is threaded at its outer end and cooperating therewith is an internally threaded cap 36 having a central interiorly threaded block 37 with which cooperates an adjusting screw 38 having a spherical inner end 39 for engagement in the correspondingly shaped depression of the spring plate 35 so as to provide a universal joint. Said screw 38 has a suitable head or hand wheel at its outer end for operating the same, and a lock nut 40 may be employed to retain said screw in adjusted position.

Interposed between the disc 32 and the member 28 is a ball valve member 41 which is designed to engage and close the valve seat 42 constituted by the port at the open end of the bore 23 in the chamber 25. Said ball is unattached to either the member 28 or the disc 32, although it preferably rests in the depression 33 of the latter, and therefore it may roll or float freely with respect to said seat 42 and said member 28 and 32 to assure centering and proper engagement with said seat. To prevent improper displacement of said ball valve member 42 when it is not held in engagement with its seat 42 by disc 32 a guide member 43 provided with a central aperture 44 is positioned on a shoulder 45 of the body member 20, and may be held thereon in any suitable way, as by the depending skirt of the member 29. Guide member 43 is disposed in approximately the medium plane of said ball, and the size of the aperture 44 is such as not to interfere with the free rolling or floating of the ball into and out of its proper seating position, while restraining the ball against such lateral displacement as would produce misalignment with said seat.

In operation the valve is opened by the expansion of the bellows 13 which, through the member 28, lifts the ball 41 off of its seat 42 against the tension of the spring 34. When the bellows 13 contracts, the spring 34, acting through the disc 32 attached to the movable end wall of the bellows 31, returns the ball 41 to its seat. As the ball is loosely guided in its disc 43 the ball may readily roll into its properly centered and seating position, even though one or both of the bellows, or its associated parts, be warped or otherwise laterally or angularly displaced, while any angularity in the direction of the thrust exerted on the ball will not introduce harmful friction or otherwise interfere with the movement of the ball into and out of its seating position. Nor is there likelihood of the ball sticking to its seat because of the construction employed.

Moreover, it will be observed that no special form of valve seat is required, and in fact the valve seat can be formed by merely machining the port at the end of the bore in chamber 25, thereby eliminating the necessity for a removable valve seat. As the flow of the fluid from the port 42 to the outlet conduit 22 through the aperture or slot 45 is beneath the guide member 43, the ball member in its opening movement does not in any way constrict the flow of fluid, but the full area of the valve port is available for the passage of the fluid. Hence a very simple, inexpensive and highly efficient construction has been provided whereby danger of sticking of the parts has been avoided and angular or lateral displacement of the parts has been compensated for without introducing either friction in the operation of the valve member or complexity in either the valve member, the valve seat, or its associated parts. While the ball valve member is thus held in intimate contact with the two bellows, or their associated operating elements, and restrained against lateral displacement to an improper extent, it is freely floating at all times except when it is in seating contact with its port 42 and can always be brought into proper seating contact with its port.

The temperature at which the valve is operated can be nicely predetermined by adjustment of the screw 38, to predetermine the tension of the spring 34 which opposes unseating of the valve or effects its seating action. If desired the extent to which the valve may be opened may be limited by providing the body member 29 with an inwardly directed bead 46 which will cooperate with the peripheral portion of the end disc 32 so as to prevent the compression of the bellows 31 beyond the desired extent.

Where the pressure drop across the valve is small, the effect of the pressure or variations thereof is largely counterbalanced by the action of the pressure on the substantially equal effective areas of the bellows 13 and 31, and so long as the maximum pressure tending to open the valve does not exceed the pressure in the outlet by an amount equal to the predetermined tension of the spring 34, the pressure within the system may vary within considerable limits without affecting the valve action. Where the pressure drop across the valve may be appreciable the effect of the drop can be largely minimized, as shown in Fig. 2, by increasing the size of the ball valve member 42' so as to make the contact area of the ball valve member substantially equal to the effective area of the bellows 13 and 31.

While the ball guide member may take the form of an apertured disc 43 as shown in Figs. 1 and 2, which construction possesses the advantage of simplicity and cheapness of construction since the guide member can be formed by punching the same from sheet metal, other forms of guide member may be employed. A second form of guide member is illustrated in Figs. 3 and 4 which possesses certain advantages of its own with respect to providing sufficient cross-sectional area for the free flow of fluid when the ball valve member is moved out of contact with its seat, while at the same time the construction is simple and inexpensive to produce. As here shown the guide member is in the form of a star-shaped element 50 which may be seated in a recess 51 formed around the outlet end of the bore 23, or this form of guide member could be used for the guide member 43. Said star-shaped member may be formed in any suitable way as by stamping the same out of sheet metal or by bending a thin strip into the star-shaped formation illustrated. In either event the outer portions of the guide member cooperate with the peripheral wall of the recess 51 to prevent displacement of the guide member and if preferred said guide member may be soldered or otherwise suitably retained in said recess, while the inner points thereof form a loose guide preventing improper displacement of the ball, analogously as the aperture 44 in the guide member 43. At the same time the passages between the points of the star afford a sufficient cross-section for flow of the fluid as the ball is moved away from its seat.

It will therefore be perceived that the present invention accomplishes the several objects herein set out in a simple and practical manner. A temperature regulator has been provided wherein there are opposed bellows with an interposed valve member which is unaffected by the warping or lateral or angular displacement of any of the associated parts, while the difficulties heretofore experienced with valve members either rigidly or swivelly or pivotally attached to one or both of the bellows have been entirely overcome. At the same time a valve mechanism has been provided which enables the use of a freely floating ball as the valve member without necessitating the use of any particular form of valve seat, or even a removable valve seat, and which enables the use of a port that is machined directly in the body of the valve casing, while the guide for the valve member which permits the ball to freely float into and out of its proper seating contact with the port restrains the same against improper displacement and is of a particularly simple and inexpensive construction.

While the embodiments of the invention illustrated on the drawing have been described with considerable particularity, it is to be understood that the invention is not to be restricted thereto, as the same is capable of receiving a variety of mechanical expressions, some of which will now readily suggest themselves to those skilled in the art, while changes may be made in the details of construction, size, arrangement and proportion of parts without departing from the spirit of this invention. Reference is therefore to be had to the appended claims for a definition of said invention.

What is claimed is:

1. A temperature regulator including in combination a valve casing provided with a valve seat, opposed flexible walls associated with said casing, a valve member interposed between said flexible walls and cooperating with said seat, said valve member being freely floating and unattached to either of said flexible walls, and means independent of said seat and flexible walls for retaining said valve member in substantial alignment with said seat.

2. A temperature regulator including in combination a valve casing provided with a valve seat, opposed flexible walls associated with said casing, a valve member interposed between said flexible walls and cooperating with said seat, said valve member being in the form of a ball unattached to either of said flexible walls, and means independent of said flexible walls for retaining said ball in operative engagement with said flexible walls.

3. A temperature regulator including in combination a valve casing provided with a valve seat, a ball valve member for cooperation with said seat, a pair of opposed flexible walls associated with said valve casing and operatively engaged with but unattached to said ball valve member, means independent of said valve seat for retaining said ball valve member in substantial alignment with the seat, and resilient means associated with one of said flexible walls for retaining the same in engagement with said ball valve member.

4. A temperature regulator including in combination a valve casing provided with a valve seat, a ball valve member for cooperation with said seat, a pair of opposed expansible and collapsible members associated with said valve casing and operatively engaged with said ball valve member, resilient means associated with one of said expansible and collapsible members for retaining the same in operative engagement with said ball valve member, and means for adjusting said resilient means and having a universal connection therewith whereby said resilient means and adjusting means may assume an angular relationship.

5. A temperature regulator including in combination a valve casing provided with a valve seat, a ball valve member for cooperation with said seat, a pair of opposed flexible walls associated with said valve casing and operatively engaged with said ball valve member, and means spaced from said valve seat and said flexible walls and associated with said ball valve member for restraining lateral displacement thereof within predetermined limits when said ball valve member is out of engagement with its seat, said restraining means permitting limited but free lateral movement of said ball valve member with respect to both its seat and its opposed flexible walls.

6. A valve mechanism including in combination a valve casing provided with a port, said port also constituting a valve seat integral with said valve casing, a ball valve member adapted to engage said seat, means spaced from said seat and associated with said valve member for permitting a free floating movement thereof but restraining the same against such lateral movement as to produce substantial misalignment with said seat, and means for operating said valve member.

7. A valve mechanism including in combination a valve casing provided with a valve seat, a ball valve member adapted to engage said seat, means for operating said valve member, and means for permitting free floating movement of said ball valve member into and out of engagement with its seat while restraining said ball valve member against large lateral displacement, said means being spaced from said valve seat so that the passage to or from said seat is between said means and said seat whereby said passage is not constricted by said valve member as it moves away from said seat.

8. A valve mechanism including in combination a valve casing provided with a valve seat, a ball valve member adapted to engage said seat, means for operating said valve member, and means for permitting free floating movement of said ball valve member into and out of engagement with its seat while restraining said ball valve member against large lateral displacement, said means including a disc provided with an aperture loosely embracing said ball valve member and supported in said casing in spaced relation to said valve seat.

9. A valve mechanism including in combination a valve casing provided with a valve seat, a ball valve member adapted to engage said seat, means for operating said valve member, and means for permitting free floating movement of said ball valve member into and out of engagement with its seat while restraining said ball valve member against large lateral displacement, said means including a member provided with a plurality of inwardly directed projections which loosely center said ball valve member and provide intermediate passages for the flow of fluid to or from said valve seat.

10. A valve mechanism including in combination a valve casing provided with a valve seat, a ball valve member adapted to engage said seat, means for operating said valve member, and means for permitting free floating movement of said ball valve member into and out of engagement with its seat while restraining said ball valve member against large lateral displacement, said valve casing being provided with a seat separate from said valve seat and said means for restraining said ball valve member being supported on said last named seat and loosely surrounding said ball valve member.

11. A valve mechanism including in combination a valve casing provided with a valve seat, a ball valve member adapted to engage said seat, means for operating said valve member, means independent of said valve seat for permitting free floating movement of said ball valve member into and out of engagement with its seat while restraining said ball valve member against large lateral displacement, and an expansible and collapsible wall engaging but unattached to said ball valve member for operating the same.

12. A valve mechanism including in combination a valve casing provided with a valve seat, a ball valve member adapted to engage said seat, means for operating said valve member, means independent of said valve seat for permitting free floating movement of said ball valve member into and out of engagement with its seat while restraining said ball valve member against large lateral displacement, opposed expansible and collapsible vessels operatively associated with said ball valve member but unattached thereto, adjustable resilient means in one of said expansible and collapsible vessels for predetermining the resistance to movement of said ball valve member, and temperature responsive means operatively associated with the other of said expansible and collapsible vessels.

13. A valve mechanism including in combination a valve casing provided with a valve seat, a ball valve member adapted to engage said seat, means for operating said valve member, means for permitting free floating movement of said ball valve member into and out of engagement with its seat while restraining said ball valve member against large lateral displacement, and an expansible and collapsible member operatively associated with said ball valve member for actuating the same, said last named member and said ball valve member having substantially equal effective areas.

14. A temperature regulator including in combination a valve casing, opposed expansible and collapsible members associated with said casing, a valve seat in said casing, a ball valve member interposed between said expansible and collapsible members and adapted to cooperate with said seat, said ball valve member being unattached to either of said expansible and collapsible members whereby it is not displaced by angular or lateral displacement of said members, and means independent of said valve seat and loosely embracing said ball valve member to permit rolling movement thereof into and out of engagement with its seat while restraining the same against substantial misalignment with said seat.

WILLIAM W. CARSON, Jr.